United States Patent
Jensen

(10) Patent No.: US 7,734,288 B1
(45) Date of Patent: Jun. 8, 2010

(54) IN-CABIN PHONE SERVICE BY EXTENDING CELLULAR UM INTERFACE

(75) Inventor: Dana J. Jensen, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 1102 days.

(21) Appl. No.: 11/339,595

(22) Filed: Jan. 25, 2006

(51) Int. Cl.
    H04B 7/00 (2006.01)
(52) U.S. Cl. .................. 455/431; 455/430; 455/428; 455/41.2
(58) Field of Classification Search ............ 455/431, 455/427–430, 433, 403, 414.1, 422.1, 432.1, 455/41.2
    See application file for complete search history.

(56) References Cited

U.S. PATENT DOCUMENTS

| 6,804,515 | B1* | 10/2004 | McCraw et al. ............ 455/431 |
| 7,107,062 | B2* | 9/2006 | Cruz et al. ................. 455/453 |
| 7,113,780 | B2* | 9/2006 | McKenna et al. .......... 455/431 |
| 7,177,638 | B2* | 2/2007 | Funderburk et al. ........ 455/431 |
| 2002/0160773 | A1* | 10/2002 | Gresham et al. ............ 455/431 |

OTHER PUBLICATIONS

"Using Your Cell Phone on Airplanes", FCC Consumer Advisory, Jan. 12, 2005.
"FCC to Examine Ban on Using Cellular Telephones on Airborne Aircraft", FCC News, Dec. 15, 2004.
"Personal Cell Phone Use Inflight", AirCell Presentation to the WAEA Technical Committee, Jul. 30, 2002.
Altobridge Products Web Page http://www.altobridge.com/products.htm.
US Patent Application for "Cell Phone Audio/Video In-Flight Entertainment System" by James P. Mitchell, U.S. Appl. No. 11/151,108, filed Jun. 13, 2005.
US Patent Application for "Global Cell Phone System and Method for Aircraft" by James P. Mitchell, U.S. Appl. No. 11/151,090, filed Jun. 13, 2005.

* cited by examiner

Primary Examiner—Tony T Nguyen
(74) Attorney, Agent, or Firm—Matthew J. Evans; Daniel M. Barbieri

(57) ABSTRACT

An airborne cell phone system comprises a cabin-based system for communicating with a ground station over a satellite link. A base station transceiver is in the ground station and an air interface (Um) is extended to a cabin-based mobile as if the cabin-based mobile is ground-based. The cabin-based system includes the cabin-based mobile for communicating over the Um interface. A custom device emulates the Um interface and communicates with the cabin-based mobile. A cabin transceiver connected to the custom device communicates with the custom device and the satellite link. The ground station further comprises a ground transceiver for communicating with the satellite link. A handset emulator connected the ground transceiver emulates a handset and communicates with the ground transceiver. A ground Um interface communicates with the handset emulator and the base station transceiver communicates with the ground Um interface.

22 Claims, 5 Drawing Sheets

IN-CABIN PHONE SERVICE BY EXTENDING CELLULAR UM INTERFACE

CROSS REFERENCE TO RELATED APPLICATIONS

The present application is related to co-pending application Ser. No. 11/151,108, filed Jun. 13, 2005, and entitled "Cell Phone Audio/Video In-Flight Entertainment System" by James P. Mitchell. The present application is related to co-pending application Ser. No. 11/151,090, filed Jun. 13, 2005, and entitled "Global Cell Phone System and Method for Aircraft" by James P. Mitchell. The co-pending applications are incorporated by reference and are assigned to the assignee of the present invention.

BACKGROUND OF THE INVENTION

The present invention generally relates to cellular telephone communications systems, airborne cellular systems, and specifically to an airborne cellular GSM (Global System for Mobile Communications) system that provides service by extending a cellular Um interface.

Use of cellular telephones and other wireless data devices onboard aircraft has been banned by the Federal Communications Commission (FCC) and restricted by the Federal Aviation Administration (FAA). The FCC ban is in place to avoid interference with terrestrial cellular systems while an aircraft flies over a cellular network. The FAA regulations restrict the use of cell phones on an aircraft to ensure against interference to onboard communications and navigation equipment. In mid-December, 2004, the FCC announced that it is going examine relaxing its ban on cell phone use in aircraft. A relaxation in the FCC rules will still be subject to the rules and policies of the FAA and aircraft operators.

The FCC is proposing to permit airborne use of cell phones and other wireless devices at the devices lowest power settings under control of a picocell located on the aircraft and only if such operation does not interfere with terrestrial cellular systems. In small cell phone networks picocells are the smallest of radio cells. Picocells often extend to just a few hundred meters in diameter in ground applications. Picocells are generally used to fill in areas of poor coverage or provide coverage in remote locations where there is no standard cellular service available. Onboard an aircraft a cell phone user makes a call that goes to the picocell. The picocell then communicates from the aircraft using a transceiver to a ground station or to a satellite and from the satellite to a ground station and finally to connect to a public switched telephone network (PSTN).

An onboard picocell presents multiple problems related to connection to a ground-based cellular infrastructure. These problems have been and are being addressed by various companies and organizations.

One approach to offering cellular GSM service on aircraft is to place a picocell or BTS (base transceiver station) onboard. The BTS must be connected to a base station controller (BSC) on the ground. To offer onboard cell phone service worldwide, this air-ground link is typically supplied through satellite communications systems (SATCOM) such as Globalstar and Inmarsat. A normal BTS to BSC interface (A-bis interface) requires a T1 line. A T1 line is a high bandwidth telephone line that can handle 24 voice or data channels at 64 kilobits per second, over two twisted pair wires. A T1 line is capable of sending and receiving very large text files, graphics, sounds, and databases very quickly. A dedicated T1 over an existing SATCOM system is inefficient and very expensive.

One solution to the problem is to use a gateway onboard the aircraft to reduce the information on the A-bis connected to the onboard BTS, passing the reduced data over the satellite link, connecting to a second gateway on the ground to regenerate the A-bis before connecting to the ground-based BSC.

Another problem to be solved is the apparent need for an onboard BTS to roam from a BSC at one ground station to that at another. This is the case given the satellite serving the air-ground link must change during a flight, which may occur on flights between the U.S. and Europe for example (depending on the satellite constellation providing the link). Although the GSM standard allows mobiles to roam from one BTS to another, it does not allow for a BTS to roam from one BSC to another. Other approaches seen involve placing more capability onboard, such as including a BSC along with the BTS, or even portions of an MSC (mobile switching center).

Current solutions proposed by industry players only offer partial performance solutions. There is a need for seamless in-flight cell phone coverage by offering a roaming capability. Furthermore, a need exists for an in-flight cell phone system capable of providing needed cell phone performance at lowest costs.

SUMMARY OF THE INVENTION

An in-cabin cell phone system that extends a cellular Um interface is disclosed. The in-cabin cell phone system comprises a cell phone for communicating over the Um interface. A custom device emulates the Um interface and communicates with the cell phone. A cabin transceiver is connected to the custom device for communicating with the custom device. A ground transceiver communicates with the cabin transceiver. A handset emulator is connected to the ground transceiver for emulating a handset and for communicating with the ground transceiver. A ground Um interface is used for communicating with the handset emulator. A base station transceiver communicates with the ground Um interface.

The in-cabin cell phone system further comprises a ground A-bis interface connected to the base station transceiver for communicating with the base station transceiver and a base station controller connected to the ground A-bis interface for communicating with the ground A-bis interface.

The in-cabin cell phone system further comprises a cabin custom interface connected to the custom device and the cabin transceiver for communicating therebetween and a ground custom interface connected to the ground transceiver and the GSM handset emulator for communicating therebetween.

In the in-cabin cell phone system the cell phone may be a GSM device. The custom device may also communicate with an IEEE 802.11 device, a BLUETOOTH device, and a direct wired device.

In the in-cabin cell phone system the handset emulator and the base station transceiver may be combined into a custom base station transceiver thereby eliminating the ground Um interface.

It is an object of the present invention to provide an airborne in-cabin cell phone service by extending a cellular Um interface.

It is an object of the present invention to provide an airborne cell phone system with needed performance at lowest cost.

It is an advantage of the present invention to solve a roaming problem for an airborne cell phone system.

It is an advantage of the present invention to eliminate T1 lines to reduce cost in a in-cabin cell phone system.

It is a feature of the present invention to utilize airborne picocells to be in compliance with regulatory requirements.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein is for an aircraft cell phone system where a base station transceiver (BTS) is ground-based and an air interface (Um) is extended from the ground to an onboard mobile cell phone. The invention is described herein as a GSM cell phone system but any cell phone system may be used to implement the present invention.

Figure 1:
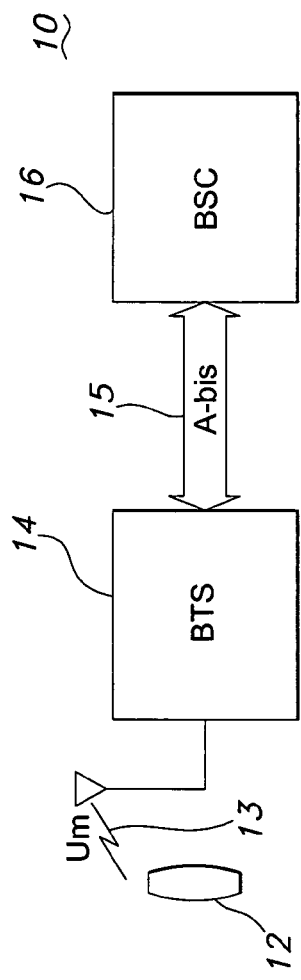
FIG. 1 is a block diagram of a portion of a typical ground GSM cellular network.

A portion of a typical ground GSM cellular network 10 is shown in FIG. 1. The cellular network 10 consists of a cell phone or mobile 12 that communicates with a BTS (base transceiver station) 14 over an air interface (Um interface) 13. The BTS 14 connects over an A-bis interface 15 to a BSC (base station controller) 16 that connects to an MSC (mobile switching center). The MSC is not relevant to the present invention topic and therefore not shown in FIG. 1.

Figure 2:
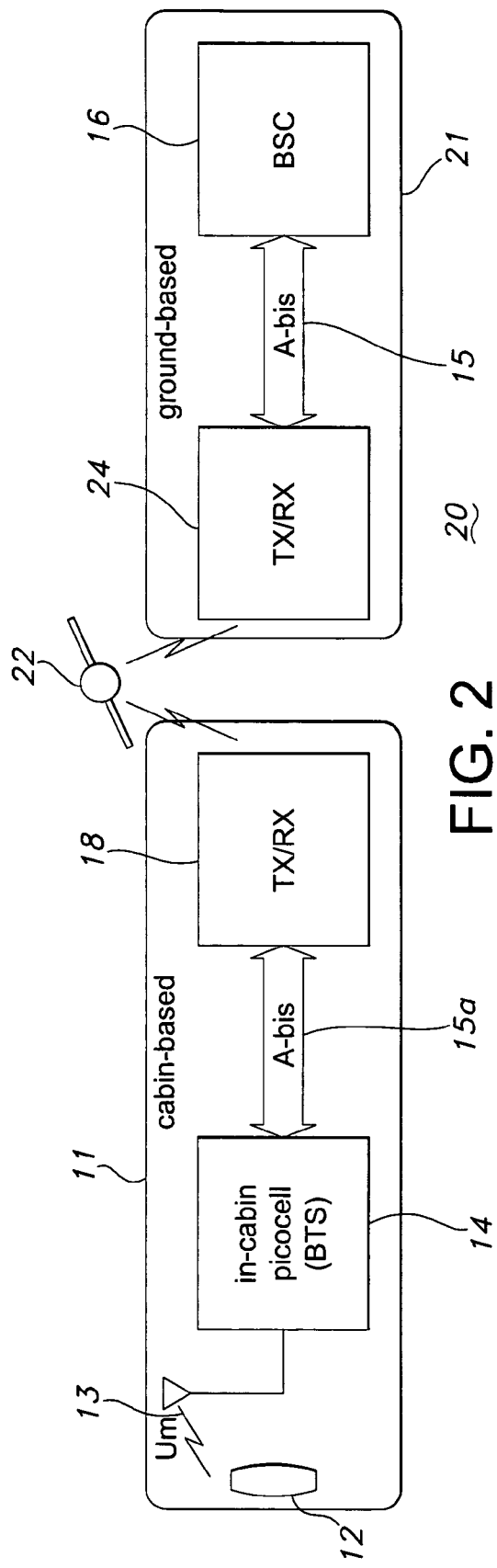
FIG. 2 is block diagram of an aircraft cabin cell phone system obtained by modifying the cellular system of FIG. 1.

To provide an aircraft cabin cell phone system 20, the cellular system 10 can be modified, as shown in FIG. 2, by placing an in-cabin picocell that is the BTS 14 of FIG. 1 onboard the aircraft in cabin 11 with a cabin A-bis interface 15a to a cabin transceiver (TX/RX) 18 to be routed over a satellite link 22. The cell phone 12 communicates over the Um interface 13 with the BTS 14 as in FIG. 1. The satellite link 22 communicates with a ground station 21 having a ground transceiver (TX/RX) 24 that is connected to the BSC 16 over the ground A-bis interface 15. The system 20 can support many cell phones 12 while only one is shown in FIG. 2. While a satellite link 22 is shown in FIG. 2, the cabin transceiver 18 may communicate directly with the ground transceiver 24 and eliminate the satellite link 22.

The system 20 shown in FIG. 2 is the approach under consideration for approval by the FCC and being planned by several suppliers to implement the airborne cellular network 20. Using this approach the power controlled low-power cell phone 12 operates with the picocell 14 and cabin transceiver 18 that operate at frequencies different than terrestrial cellular telephone networks to avoid interference.

Figure 3:
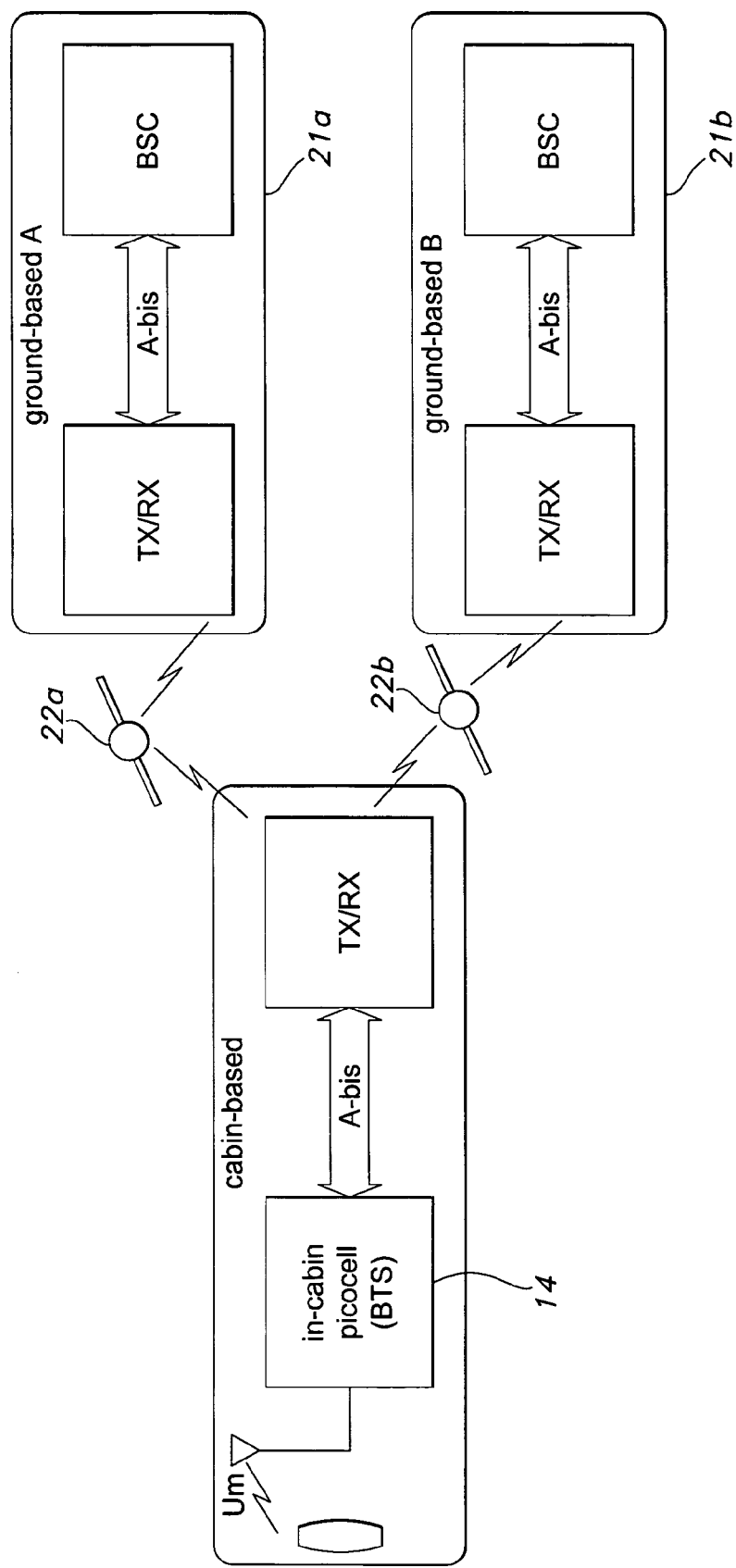
FIG. 3 illustrates the roaming problem of the system of FIG. 2.

The disadvantage of the system 20 is the requirement to maintain an expensive and inefficient T1 line on the cabin A-bis 15a and over the satellite link 22 for the duration of the flight. Another disadvantage is the roaming BTS 14 problem, shown in FIG. 3. If satellite 22a is in sight at the start of the flight, but out of sight by the end of the flight, and satellite 22b is not in sight at the start of the flight but is at the end of the flight, then the BTS 14 must connect to ground station 21a at the start of the flight but roam to ground station 21b during the flight.

Figure 4:
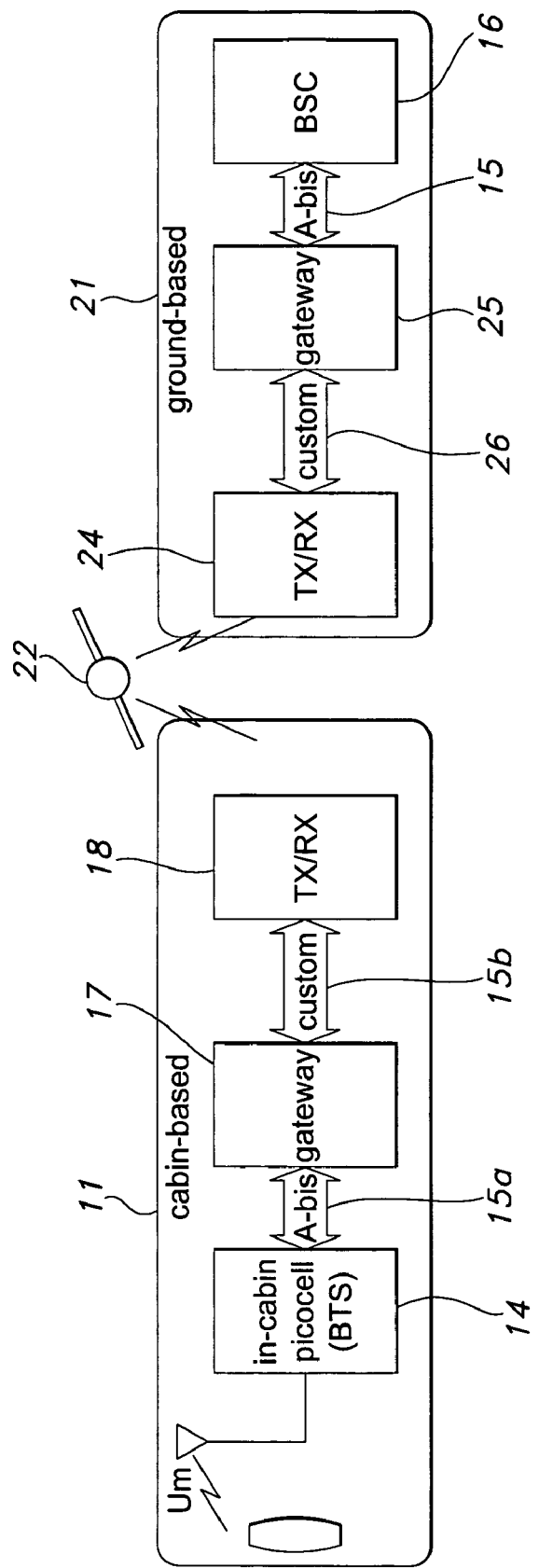
FIG. 4 illustrates a proposed solution to reduce cabin A-bis interface T1 traffic.

A proposed solution, shown in FIG. 4, to reduce the cabin A-bis interface 15a T1 traffic routed through the satellite 22 is to use a cabin gateway 17 is to communicate through a custom interface 15b with the cabin transceiver 18. The cabin gateway 17 compresses data received on the A-bis interface 15a. The ground A-bis 15 is restored at the ground station 21 using a ground gateway 25 that communicates with the ground transceiver 24 through a ground custom interface 26 before connecting to the BSC 16. The ground gateway 25 decompresses data sent over the satellite link to restore the A-bis interface. The advantage of this solution is that it can operate with an off-the-shelf BTS 14, while reducing the amount of data that passed through the satellite 22.

Figure 5:
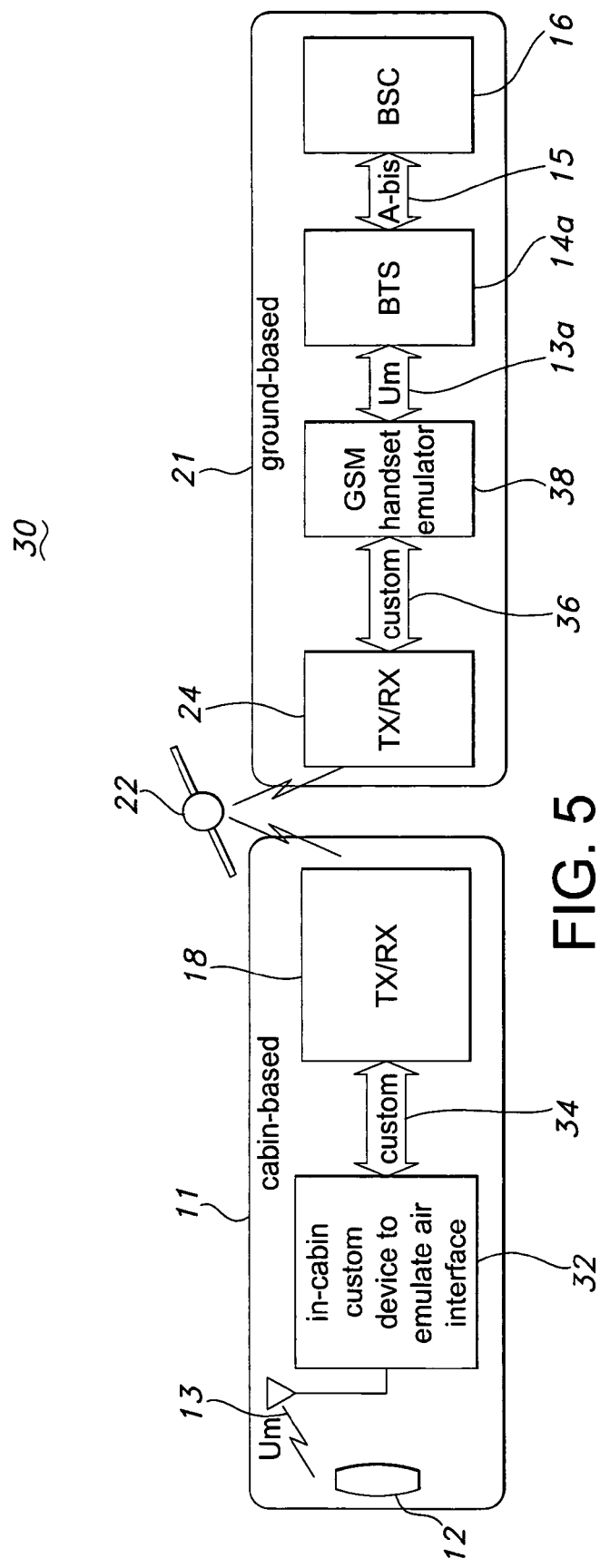
FIG. 5 shows the present invention for an in-cabin cell phone system that extends the cellular Um interface.

The present invention for an in-cabin cell phone system 30 that extends the cellular Um interface is shown in FIG. 5. The satellite link 22 is again shown in FIG. 5 but the present invention may be used to directly communicate between the ground station 21 and the cabin 11. Rather than compressing the cabin A-bis interface 15a in the cabin gateway 17 of FIG. 4, the BTS 14 is moved from the cabin 11 and becomes a ground-based BTS 14a in the ground station 21. The air interface (Um) 13 is effectively extended from the ground to the onboard mobile 12. From the perspective of a GSM network, the system 30 works as if the call is made by a ground-based mobile (not shown). The air interface (Um) 13 is already efficient as opposed to a T1 carrying the A-bis on the satellite link. The satellite link 22 does not carry unnecessary information.

The cellular air interface Um 13 is used as before between the onboard mobile cell phone 12. An onboard custom device 32 is used to emulate the air interface and may be based on a picocell. The custom device 32 utilizes a cabin custom interface 34 to relay information to and from a GSM handset emulator 38 in the ground station 21 through the cabin transceiver 18, the satellite link 22, the ground transceiver 24, and a ground custom interface 36. The handset emulator 38 receives the information and, if necessary, reformats it for a ground Um interface 13a. The ground BTS 14a is connected to the ground Um interface 13a and then to the ground A-bis 15. The BSC 16 is connected to the ground A-bis 15.

An option is to modify the BTS 14a to accept the custom interface 36 used to extend the Um interface 13a. Although FIG. 5 shows the ground-based emulator 38 generating an output signal in the Um format 13a to pass to the BTS 14a, a custom BTS may eliminate the need to take the baseband data to RF only to have the BTS 14a return the information to baseband. The emulator 38 and BTS 14a may be a single unit with air interface 13a eliminated.

In FIG. 5 the BTS 14a does not roam, so there is no need to address the roaming BTS issue. Calls from the BTS 14a at the ground station 21 may be handed over to a BTS (not shown) at another ground station (not shown). Before the cabin transceiver 18 changes identity from the BTS 14a at ground station 21 to that at another, the cabin transceiver 18 can broadcast to the adjacent cell for roaming purposes using the identity of the BTS at the next ground station. Ground-based routing can re-route the call from the originating BTS 14a to the destination BTS while the onboard mobile 12 makes the transition to the new BTS.

Figure 6:
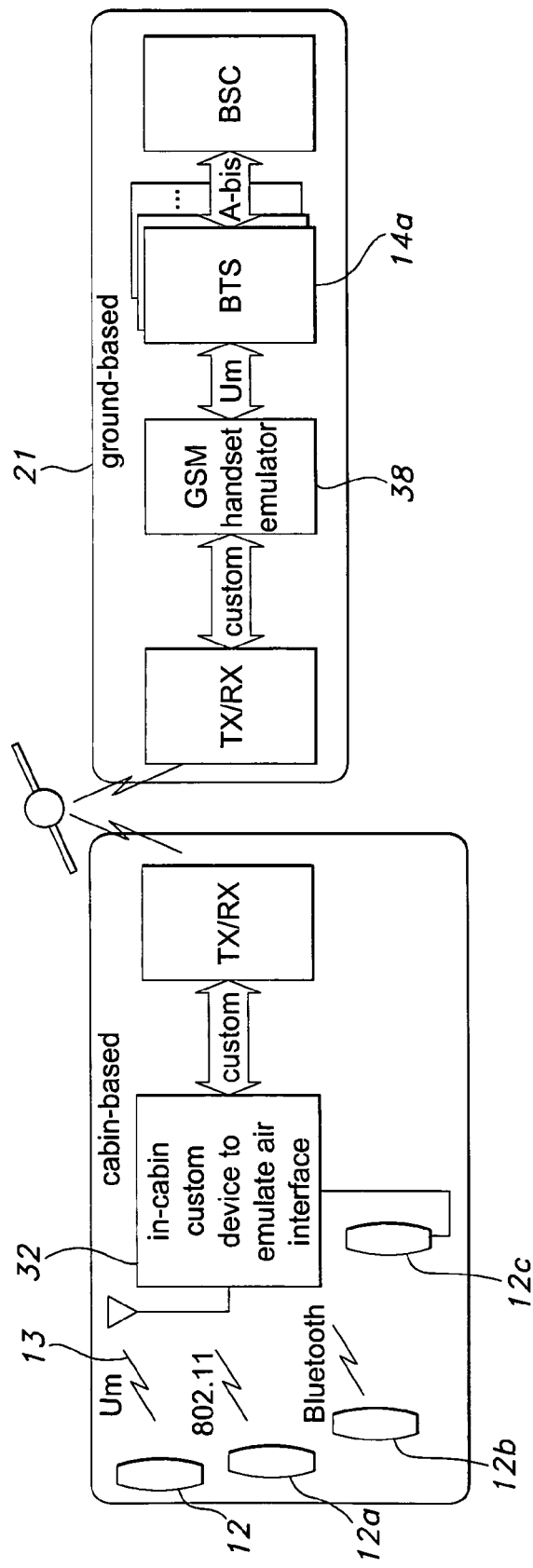
FIG. 6 shows the system FIG. 5 in use with several onboard communications devices.

The system 30 of FIG. 5 may be used with several onboard communications devices such as the GSM device 12, an IEEE 802.11 device 12a, a BLUETOOTH device 12b, and a direct wired device 12c that have an interface to the custom device 32 to route communications to the ground-based cellular system 21 as shown in FIG. 6. The GSM device 12 may be an Enhanced Data rate for GSM Evolution (EDGE) device.

The onboard custom device 32 is required to serve two purposes to relay ground-based BTS information to the onboard mobiles 12, 12a, 12a, 12b, and 12c and to acquire and relay call-related information from the onboard mobiles to the ground-based mobile emulator 38. An example of ground-based BTS 14a information relayed to the onboard mobiles may be a BSIC (base station identity code). The ground station 21 may have many base transceiver stations 14a. Another example is encoded voice received from a ground-routed call to an onboard mobile.

The devices in the aircraft that do not rely on the cellular air interface Um 13 may be used for billing purposes. Each device may have a SIM (subscriber identity module) (not shown) to which a call can be charged. FIG. 6 shows some of the options. Any communications device such as the 802.11 device 12a, the Bluetooth device 12b, and the direct wired device 12c that has an interface to the custom onboard device 32 may be routed to the ground station 21. If a device has no SIM, it may be possible for a system SIM to be maintained for use with the onboard user billed by a third party, such as the airlines. In the case of a voice call, the main data passed from air to ground is vocoded voice regardless of the onboard interface. Using an interface other than the cellular air interface Um 13 is attractive as interference with other ground-based systems, a major concern of cellular operators, is virtually eliminated.

It is believed that the aircraft cell phone system with extended cellular Um interface of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A ground cell phone system for use with an in-cabin cell phone system that extends a cellular Um interface, the in-cabin cell phone system including a cell phone for communicating over the Um interface, a custom device that emulates the Um interface and communicates with the cell phone, and an in-cabin transceiver connected to the custom device and for communicating with the custom device, the ground cell phone system comprising:
a ground transceiver for communicating with the in-cabin transceiver;
a handset emulator connected to the ground transceiver, for emulating a handset, and for communicating with the ground transceiver;
a ground Um interface for communicating with the handset emulator; and
a base station transceiver for communicating with the ground Um interface.

2. The phone system of claim 1 further comprising:
a ground A-bis interface connected to the base station transceiver for communicating with the base station transceiver; and
a base station controller connected to the ground A-bis interface for communicating with ground A-bis interface.

3. The phone system of claim 1 further comprising an in-cabin custom interface connected to the custom device and the in-cabin transceiver for communicating therebetween.

4. The phone system of claim 1 further comprising a ground custom interface connected to the ground transceiver and the handset emulator for communicating therebetween.

5. The phone system of claim 1 wherein the cell phone is a GSM (Global System for Mobile Communications) device.

6. The phone system of claim 1 wherein the custom device communicates with at least one of an IEEE 802.11 device, a BLUETOOTH device, a direct wired device, and an enhanced data rate GSM evolution device.

7. The phone system of claim 1 wherein the handset emulator and the base station transceiver are combined into a custom base station transceiver thereby eliminating the ground Um interface.

8. A ground cell phone system for use with an in-cabin cell phone system, the in-cabin cell phone system including, a UM interface, a cell phone for communicating over the Um interface, a custom device that emulates the Um interface and communicates with the cell phone, and a cabin transceiver connected to the custom device and for communicating with the custom device, the ground cell phone system comprising:
a ground transceiver for communicating with the in-cabin transceiver; and
a custom base station transceiver for communicating with the ground transceiver, the custom base station including a custom interface associated with the custom device that emulates the Um interface.

9. The phone system of claim 8 wherein the custom base station transceiver emulates a handset to communicate with the ground transceiver.

10. The phone system of claim 8 further comprising:
a ground A-bis interface connected to the custom base station transceiver for communicating with the custom base station transceiver; and
a base station controller connected to the ground A-bis interface for communicating with the ground A-bis interface.

11. The phone system of claim 8 further comprising an in-cabin custom interface connected to the custom device and the in-cabin transceiver for communicating therebetween.

12. The phone system of claim 8 further comprising a ground custom interface connected to the ground transceiver and the custom base station transceiver for communicating therebetween.

13. The phone system of claim 8 wherein the cell phone is a GSM (Global System for Mobile Communications) device.

14. The phone system of claim 8 wherein the custom device communicates with at least one of an IEEE 802.11 device, a BLUETOOTH device, a direct wired device, and an enhanced data rate GSM evolution device.

15. A ground cell phone system for use with an airborne cell phone system comprising a cabin-based system for communicating with a ground station, the ground cell phone system comprising: a base station transceiver disposed in the ground station and wherein an air interface (Um) is extended to a cabin-based mobile as if the cabin-based mobile is ground-based, wherein the ground station includes a handset emulator.

16. The phone system of claim 15 wherein the cabin-based system further comprises:
the cabin-based mobile for communicating over the Um interface;
a custom device that emulates the Um interface and communicates with the cabin-based mobile; and a cabin transceiver connected to the custom device and for communicating with the custom device.

17. The phone system of claim 16 wherein the ground station further comprises:
   a ground transceiver for communicating with the cabin transceiver;
   the handset emulator connected the ground transceiver, for emulating a handset, and for communicating with the ground transceiver;
   a ground Um interface for communicating with the handset emulator; and
   the base station transceiver for communicating with the ground Um interface.

18. The phone system of claim 17 wherein the ground station further comprises:
   a ground A-bis interface connected to the base station transceiver for communicating with the base station transceiver; and
   a base station controller connected to the ground A-bis interface for communicating with the ground A-bis interface.

19. The phone system of claim 16 wherein the cabin-based system further comprises an in-cabin custom interface connected to the custom device and the cabin transceiver for communicating therebetween.

20. The phone system of claim 17 wherein the ground station further comprises a ground custom interface connected to the ground transceiver and the handset emulator for communicating therebetween.

21. The phone system of claim 15 wherein the cabin-based mobile is a GSM (Global System for Mobile Communications) device.

22. The phone system of claim 17 wherein the handset emulator and the base station transceiver are combined into a custom base station transceiver thereby eliminating the ground Um interface.

* * * * *